United States Patent
Zou

(10) Patent No.: US 11,142,665 B2
(45) Date of Patent: Oct. 12, 2021

(54) RUBBER COATING COMPOSITION FOR CONVEYOR BELT, LAMINATE, AND CONVEYOR BELT

(71) Applicant: THE YOKOHAMA RUBBER CO., LTD., Tokyo (JP)

(72) Inventor: Deqing Zou, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 153 days.

(21) Appl. No.: 16/498,187

(22) PCT Filed: Dec. 21, 2017

(86) PCT No.: PCT/JP2017/045886
§ 371 (c)(1),
(2) Date: Sep. 26, 2019

(87) PCT Pub. No.: WO2018/179629
PCT Pub. Date: Oct. 4, 2018

(65) Prior Publication Data
US 2020/0317945 A1 Oct. 8, 2020

(30) Foreign Application Priority Data
Mar. 30, 2017 (JP) .............................. JP2017-066847

(51) Int. Cl.
*C09D 109/06* (2006.01)
*B65G 15/34* (2006.01)
(Continued)

(52) U.S. Cl.
CPC ............ *C09D 109/06* (2013.01); *B65G 15/34* (2013.01); *C09D 107/00* (2013.01); *B65G 15/32* (2013.01); *C08K 3/36* (2013.01); *C08K 5/47* (2013.01)

(58) Field of Classification Search
CPC ....... C09D 109/06; C09D 107/00; C08L 9/06; C08L 7/00; C08L 9/00; C08K 5/47; C08K 3/36; B65G 15/34
See application file for complete search history.

(56) References Cited

U.S. PATENT DOCUMENTS 5,252,405 A 10/1993 Kaido et al.
2007/0187030 A1 8/2007 Bernard et al.
(Continued)

FOREIGN PATENT DOCUMENTS

JP 2014-210640 A 11/2014
WO 2015/083746 A1 6/2015
(Continued)

OTHER PUBLICATIONS

Office Action issued to the corresponding Australian Patent Application No. 2017406729 dated Aug. 17, 2020.

*Primary Examiner* — Nicholas E Hill
(74) *Attorney, Agent, or Firm* — Carrier Blackman & Associates, P.C.; Joseph P. Carrier; William D. Blackman

(57) ABSTRACT

The present invention addresses the problem of providing a rubber coating composition for use in a conveyor belt, the composition excelling in both peel force and rubber sticking and having excellent canvas adhesiveness, and of providing a laminate and a conveyor belt. The rubber coating composition for a conveyor belt of the present invention contains a diene-based rubber component, di-2-benzothiazolyl disulfide, silica, a cresol formaldehyde resin, and a modified etherified methylol melamine. The content amounts of each of the di-2-benzothiazolyl disulfide, silica, cresol formaldehyde resin, and modified etherified methylol melamine are all within predetermined ranges.

5 Claims, 3 Drawing Sheets

(51) Int. Cl.
*C09D 107/00* (2006.01)
*C08K 3/36* (2006.01)
*C08K 5/47* (2006.01)
*B65G 15/32* (2006.01)

(56) References Cited

U.S. PATENT DOCUMENTS

| | | |
|---|---|---|
| 2014/0228495 A1 | 8/2014 | Miyazaki |
| 2015/0083297 A1 | 3/2015 | Inata et al. |
| 2016/0185156 A1 | 6/2016 | Shibata |
| 2016/0263868 A1* | 9/2016 | Tomoi .................... B32B 25/02 |
| 2017/0305194 A1 | 10/2017 | Shibata |
| 2018/0126784 A1 | 5/2018 | Ozturk et al. |
| 2018/0207986 A1 | 7/2018 | Shibata |

FOREIGN PATENT DOCUMENTS

| | | |
|---|---|---|
| WO | 2016/047792 A1 | 3/2016 |
| WO | 2016/175272 A1 | 11/2016 |
| WO | 2017/014157 A1 | 1/2017 |

* cited by examiner

RUBBER COATING COMPOSITION FOR CONVEYOR BELT, LAMINATE, AND CONVEYOR BELT

TECHNICAL FIELD

The present invention relates to a rubber coating composition for a conveyor belt, a laminate, and a conveyor belt.

BACKGROUND ART

An ordinary conveyor belt has an upper surface cover rubber layer on which an object to be transported is placed, and a lower surface cover rubber layer that contacts a drive pulley, roller, or the like, and also has a reinforcing layer sandwiched by these rubber layers.

Here, the reinforcing layer is generally formed by coating, with a rubber coating, a canvas formed by weaving reinforcing cords into a canvas shape.

In addition, since the reinforcing layer generally has a configuration in which the rubber coatings are adhered to both sides of the canvas, a rubber coating forming material is used between the canvas and the cover rubber constituting the conveyor belt, or between canvases.

As such rubber coating forming material, Patent Document 1 for example describes a "rubber coating composition for use in conveyor belts, the composition comprising: a diene-based rubber component, di-2-benzothiazolyl disulfide, a resorcinol formaldehyde resin, and hexamethoxymethylated melamine, wherein a content amount of the di-2-benzothiazolyl disulfide is from 0.25 parts by mass to 3.0 parts by mass per 100 parts by mass of the diene-based rubber component; a content amount of the resorcinol formaldehyde resin is from 1 part by mass to 5 parts by mass per 100 parts by mass of the diene-based rubber component; and a content amount of the hexamethoxymethylated melamine is from 1 part by mass to 4 parts by mass per 100 parts by mass of the diene-based rubber component" (claim 1).

CITATION LIST

Patent Documents

Patent Document 1: JP 2014-210640 A

SUMMARY OF INVENTION

Technical Problem

The present inventors investigated the rubber coating composition for a conveyor belt described in Patent Document 1, and found that rubber sticking was favorable with respect to the adhesiveness between the canvas and the rubber coating (also referred to as hereafter as "canvas adhesiveness"), but it was clear that there was room for improvement in peel force.

Therefore, an object of the present invention is to provide a rubber coating composition for a conveyor belt, the rubber coating composition excelling in both peel force and rubber sticking, and having excellent canvas adhesiveness, and to provide a laminate and a conveyor belt.

Solution to Problem

As a result of diligent examinations to solve the above problems, the present inventors discovered that a rubber composition obtained by compounding predetermined amounts of a diene-based rubber component, di-2-benzothiazolyl disulfide, silica, a cresol formaldehyde resin, and a modified etherified methylol melamine exhibited excellent canvas adhesiveness, and thereby arrived at the completion of the present invention.

That is, the present inventors discovered that the problems described above could be solved by the following configurations.

[1] A rubber coating composition for a conveyor belt, the composition containing: a diene-based rubber component; di-2-benzothiazolyl disulfide; silica; a cresol formaldehyde resin; and a modified etherified methylol melamine; wherein a content amount of the di-2-benzothiazolyl disulfide is from 0.25 parts by mass to 3.0 parts by mass per 100 parts by mass of the diene-based rubber component;

a content amount of the silica is from 5.0 parts by mass to 15.0 parts by mass per 100 parts by mass of the diene rubber component;

a content amount of the cresol formaldehyde resin is from 1 part by mass to 5 parts by mass per 100 parts by mass of the diene-based rubber component; and a content amount of the modified etherified methylol melamine is from 1 part by mass to 4 parts by mass per 100 parts by mass of the diene-based rubber component.

[2] The rubber coating composition for a conveyor belt according to [1], used as a rubber coating forming material between a cover rubber and a canvas of a conveyor belt, and/or between the canvas and another canvas.

[3] A laminate having: a canvas, and a rubber coating layer provided on both sides of the canvas, the rubber coating layer being a rubber layer that is formed using the rubber coating composition for a conveyor belt according to [2].

[4] The laminate according to [3], wherein the canvas contains nylon fibers or polyester fibers.

[5] A conveyor belt having an upper surface cover rubber layer, a laminate according to [3] or [4], and a lower surface cover rubber layer.

Advantageous Effects of the Invention

According to an embodiment of the present invention, a rubber coating composition for a conveyor belt, excelling in both peel force and rubber sticking and exhibiting excellent canvas adhesiveness, and a laminate and a conveyor belt can be provided.

DESCRIPTION OF EMBODIMENTS

Figure 1:
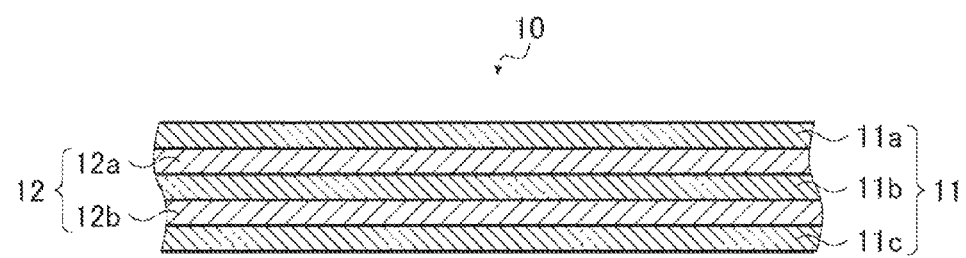
FIG. 1 is a longitudinal cross-sectional view schematically illustrating an example of a laminate of a preferable embodiment of the present invention.

The present invention is described in detail below.

Although the components described below are described based on representative embodiments of the present invention, the present invention is not limited to such embodiments.

[Rubber Coating Composition for a Conveyor Belt]

The rubber coating composition for a conveyor belt of an embodiment of the present invention (hereinafter abbreviated as "rubber composition of an embodiment of the present invention") contains a diene-based rubber component, di-2-benzothiazolyl disulfide, silica, a cresol formaldehyde resin, and a modified etherified methylol melamine.

The content amount of the di-2-benzothiazolyl disulfide is from 0.25 parts by mass to 3.0 parts by mass per 100 parts by mass of the diene-based rubber component.

The content amount of the silica is from 5.0 to 15.0 parts by mass per 100 parts by mass of the diene-based rubber component.

The content amount of the cresol formaldehyde resin is from 1 part by mass to 5 parts by mass per 100 parts by mass of the diene-based rubber component.

Furthermore, the content amount of the modified etherified methylol melamine is from 1 part by mass to 4 parts by mass per 100 parts by mass of the diene-based rubber component.

In the present invention, the diene-based rubber component, the di-2-benzothiazolyl disulfide, the silica, the cresol formaldehyde resin, and the modified etherified methylol melamine are compounded at the respective content amounts described above, and thereby the peel force and rubber sticking are both favorable, and excellent canvas adhesiveness is exhibited.

While the details are not particularly clear, as can be deduced from a comparison of Comparative Examples 4 and 6 and Example 1 described below, it is believed that because the cresol formaldehyde resin has a methyl group, and the modified etherified methylol melamine has a methylol group (—CH$_2$OH), the reactivity levels of these are improved, and a stronger adhesive effect is exhibited.

<Diene-Based Rubber Component>

The diene-based rubber component contained in the rubber composition of an embodiment of the present invention is not particularly limited as long as the rubber is sulfur-vulcanizable.

Sulfur-vulcanizable rubber is rubber that can be vulcanized using sulfur, and examples thereof include natural rubber, synthetic rubber, or mixtures thereof.

Specific examples of sulfur-vulcanizable rubber include natural rubber, isoprene rubber (IR), butadiene rubber (BR), 1,2-butadiene rubber, styrene-butadiene copolymer rubber (SBR), acrylonitrile-butadiene copolymer rubber (NBR), and chloroprene rubber, and a single type may be used alone, or two or more types may be used in combination.

Of these rubbers, natural rubber is preferably used because the canvas adhesiveness after high temperature vulcanization and after a high-temperature history is good; the use of a natural rubber in combination with a styrene-butadiene copolymer rubber and/or a butadiene rubber is more preferable; and the use of natural rubber in combination with a styrene-butadiene copolymer rubber is even more preferable.

<Di-2-Benzothiazolyl Disulfide>

The di-2-benzothiazolyl disulfide contained in the rubber composition of an embodiment of the present invention is a compound having a thiazole structure, and is represented by Formula (1) below.

[Chemical Formula 1]

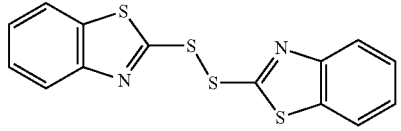

(1)

Commercially available products can be used as the di-2-benzothiazolyl disulfide, and specific examples include NOCCELER DM-P (DM) (available from Ouchi Shinko Chemical Industrial Co., Ltd.), and the like.

In the present invention, the content amount of the di-2-benzothiazolyl disulfide is from 0.25 parts by mass to 3.0 parts by mass per 100 parts by mass of the diene-based rubber component described above, and is preferably from 0.5 parts by mass to 2.5 parts by mass from the perspective of facilitating the vulcanization reaction and of achieving better canvas adhesiveness.

<Silica>

The silica contained in the rubber composition of an embodiment of the present invention is not particularly limited, and any known silica that is compounded into a rubber composition in applications such as tires can be used.

Specific examples of the silica include fumed silica, calcined silica, precipitated silica, pulverized silica, molten silica, and colloidal silica, and one type may be used alone, or two or more types may be combined and used.

In the present invention, from the perspective of achieving better canvas adhesiveness, the BET specific surface area of the silica is preferably from 50 to 250 m$^2$/g, and more preferably from 80 to 220 m$^2$/g.

Here, the BET specific surface area is a value that is obtained by measuring the amount of nitrogen gas that is adsorbed onto the silica surface, in accordance with the JIS Z8830:2013 "Method for measuring the specific surface area of a powder (solid) by gas adsorption".

In the present invention, the content amount of the silica is from 5.0 parts by mass to 15.0 parts by mass, and preferably from 8 parts by mass to 12 parts by mass, per 100 parts by mass of the diene-based rubber component described above.

<Cresol Formaldehyde Resin>

The cresol formaldehyde resin contained in the rubber composition of an embodiment of the present invention is one type of phenolic resin obtained through a condensation reaction between cresol and formaldehyde.

The cresol used in the condensation reaction is preferably m-cresol.

As the cresol formaldehyde resin, a resin that is normally used in industrial rubber compositions can be used.

Furthermore, commercially available products can be used as the cresol formaldehyde resin, and specific examples thereof include Sumikanol (trade name, same hereinafter) 610 (available from Sumitomo Chemical Co., Ltd.) represented by the following formula, and the like. Note that in the following formula, n is 16 or 17.

[Chemical Formula 2]

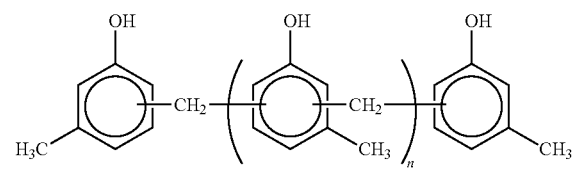

In the present invention, the content amount of the cresol formaldehyde resin is from 1 part by mass to 5 parts by mass per 100 parts by mass of the diene-based rubber component described above, and from the perspective of achieving better canvas adhesiveness, the content amount of the cresol formaldehyde resin is preferably from 1 part by mass to 4 parts by mass, and more preferably from 2 parts by mass to 4 parts by mass.

<Modified Etherified Methylol Melamine>

The modified etherified methylol melamine contained in the rubber composition of an embodiment of the present invention is a partial condensate of hexamethylol melamine pentamethyl ether (HMMPME) and is one type of conventionally known methylene donor.

As the modified etherified methylol melamine, one that is commonly used in industrial rubber compositions can be used.

Furthermore, commercially available products can be used as the modified etherified methylol melamine, and specific examples thereof include Sumikanol 507AP (available from Sumitomo Chemical Co., Ltd.), and the like.

In the present invention, the content amount of the modified etherified methylol melamine is from 1 part by mass to 4 parts by mass per 100 parts by mass of the diene-based rubber component described above, and is preferably from 2 parts by mass to 4 parts by mass from the perspective of achieving more favorable canvas adhesiveness.

<Sulfur>

The rubber composition according of an embodiment of the present invention preferably further contains sulfur.

Sulfur that is conventionally known as a vulcanizing agent can be used as the sulfur, and for example, conventionally known sulfur that is commercially available such as powdered sulfur, precipitated sulfur, colloidal sulfur, surface treated sulfur, and insoluble sulfur can be used.

In the present invention, the content amount of the sulfur when contained is preferably not greater than 3 parts by mass, more preferably from 0.1 parts by mass to 3 parts by mass, and even more preferably from 0.1 parts by mass to 2.5 parts by mass, per 100 parts by mass of the diene-based rubber component described above.

The rubber composition of an embodiment of the present invention may contain other additives as necessary in a range that does not impair the object of an embodiment of the present invention.

Examples of other additives include, for example, fillers such as carbon black; vulcanization accelerating aids such as zinc oxide and stearic acid; anti-aging agents such as phenol-based and wax-based anti-aging agents; and softening agents such as vegetable oil-based and mineral oil-based softening agents; and one of these may be contained alone, or two or more types may be contained.

The additives and the like may be kneaded by a general method to form a composition, and then used in vulcanizing or crosslinking. The compounded amount of these additives may be any conventional standard compounding amount, so long as the object of the present embodiment is not hindered.

The method for producing the rubber composition of an embodiment of the present invention is not particularly limited, and an example thereof is a method in which the above-described diene-based rubber component, di-2-benzothiazolyl disulfide, silica, cresol formaldehyde resin, and modified etherified methylol melamine, and also optional additives such as sulfur, a filler, a vulcanization accelerating aid, an anti-aging agent, and a softener are appropriately selected, and predetermined amounts thereof are added and kneaded for a predetermined time at a predetermined temperature using, for example, a roll mill or a Banbury mixer.

Furthermore, the rubber composition of an embodiment of the present invention can be suitably used as a rubber coating forming material in adhesion between a cover rubber and a canvas of a conveyor belt, and/or between the canvas and another canvas.

[Laminate]

The laminate of an embodiment of the present invention is a laminate having a canvas and rubber coating layers provided on both sides of the canvas, wherein the rubber coating layer is formed using the above-described rubber composition of an embodiment of the present invention.

Next, an example of the laminate of a preferred embodiment of the present invention will be described with reference to FIG. 1.

A laminate 10 illustrated in FIG. 1 has: rubber coating layers 11 formed using the rubber composition of the present invention, and canvases 12, and is obtained by disposing canvases 12a and 12b between each of the rubber coating layers 11a, 11b, and 11c, respectively.

In other words, the laminate 10 illustrated in FIG. 1 is formed by alternately laminating the rubber coating layers 11 and the canvases 12, and has a configuration in which the rubber coating layers 11 are adhered to both sides of the canvases 12.

Note that the laminate of the present invention is not limited to a configuration in which two canvas layers are laminated between the rubber coating layers as illustrated in FIG. 1, and may be configured by laminating at least one layer or more of canvas between the rubber coating layers.

The canvas is not particularly limited, but is preferably a canvas made from nylon fibers or polyester fibers.

In addition, the canvas is preferably a canvas that has been subjected to treatment in which a resorcin-formalin-latex liquid is impregnated (RFL treatment) in advance in order to improve adhesiveness to the rubber coating layer.

[Conveyor Belt]

The conveyor belt of the present invention has an upper surface cover rubber layer, the above-described laminate of the present invention, and a lower surface cover rubber layer.

Next, an example of a preferred embodiment of the conveyor belt of the present invention will be described with reference to FIG. 2.

Figure 2:
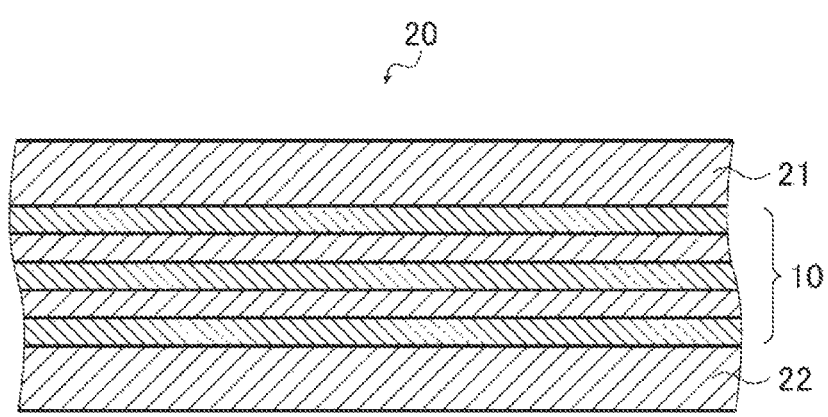
FIG. 2 is a longitudinal cross-sectional view schematically illustrating an example of a conveyor belt of a preferable embodiment of the present invention.

A conveyor belt 20 illustrated in FIG. 2 includes an upper surface cover rubber layer 21, the laminate 10 also illustrated in FIG. 1, and a lower surface cover rubber layer 22.

That is, the laminate 10 functions as a reinforcing layer in the conveyor belt, and is positioned as a center layer, and the upper surface cover rubber layer 21 and the lower surface cover rubber layer 22 are provided on the two sides of the laminate 10.

The laminate 10 also functions as an adhesive layer between the upper surface cover rubber layer 21 and the lower surface cover rubber layer 22, and is also a cushioning material with respect to the canvas 12.

The rubber composition used in the upper surface cover rubber layer 21 and the lower surface cover rubber layer 22 is not particularly limited as long as the rubber composition can be used in the cover rubber of the conveyor belt, and a known rubber composition can be used. Note that a rubber composition containing components that excel in flame retardancy, heat resistance, cold resistance, oil resistance, wear resistance, or weather resistance, depending on the application of the conveyor belt 20, is preferably used in the upper surface cover rubber layer 21 and the lower surface cover rubber layer 22.

The method for producing the conveyor belt of the present invention is not particularly limited, and a commonly used method or the like can be employed. A suitable example of a specific method is a method in which first, raw materials are kneaded using, for example, a roller, kneader, or Banbury mixer, after which the mixture is formed into a sheet shape for the upper surface cover rubber layer 21 and the lower surface cover rubber layer 22 using a roller or the like, and subsequently, the obtained layers are stacked in a predetermined order so as to sandwich the laminate (reinforcing layer) 10 obtained as described above, and then pressurized for 10 to 60 minutes at a temperature of from 140° C. to 170° C. Another suitable example is a method in which an unvulcanized reinforcing layer structure (a laminate of a rubber coating composition 11 and a canvas 12 formed from polyester fibers) is layered between the unvulcanized upper surface cover rubber layer 21 and lower surface cover rubber layer 22, and then subjected to vulcanizing for example under the conditions described above.

EXAMPLES

The present invention is described in detail below using examples. However, the present invention is not limited in any way by these examples.

Examples 1 to 4 and Comparative Examples 1 to 6

Rubber coating compositions for a conveyor belt were prepared with the compositions (parts by mass) shown in Table 1 below with respect to 100 parts by mass of a mixed rubber containing 50 parts by mass of a natural rubber (NR) and 50 parts by mass of a styrene-butadiene copolymer rubber (SBR).

The peeling force and rubber sticking of each of the obtained rubber compositions were evaluated as described below. The results thereof are shown below in Table 1 below.
<Canvas Adhesiveness>

Each of the obtained rubber coating compositions was used in the rubber coating layers, RFL treated polyester fibers were used in a canvas, and vulcanization was performed under vulcanization conditions of 148° C.×120 minutes to produce an adhesion test body (size: width 2.5 cm×depth 15 cm×height 0.5 cm), and the peel force (N/mm) was measured through a two-layer peel test.

Figure 3:
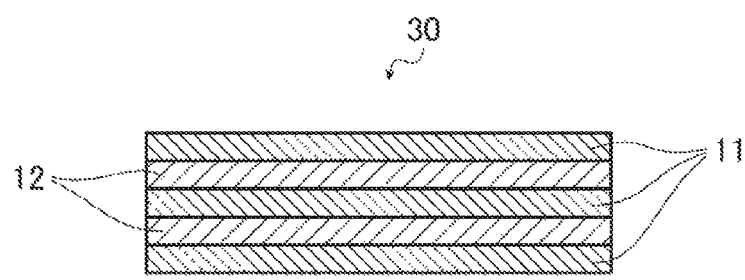
FIG. 3 is a cross-sectional view for explaining an adhesion test body used in a two-layer peel test of the examples.

FIG. 3 is a cross-sectional view for explaining an adhesion test body used in the two-layer peel test of the examples, where reference sign 30 denotes an adhesion test body, reference sign 11 denotes rubber coating layers, and reference sign 12 denotes canvases.

The peel force of each of the adhesion test bodies that were produced was measured in accordance with JIS K6256-1: 2006 "Peel strength with cloth". A peel force of 14 N/mm or greater was determined to be favorable.

Furthermore, after the peel test, the rubber affixed to the canvas surface was visually observed, and calculated as a percentage of the surface area of the rubber remaining on the canvas surface. When a fracture morphology due to peeling occurred over the entire surface of the rubber layer, rubber sticking was considered to be 100%. Rubber sticking of 90% or greater was determined to be favorable. Note that a higher percentage (%) of rubber sticking means a better adhesive property.

The results thereof are shown below in Table 1 below.

TABLE 1

|  | Comparative Examples | | | | | | Examples | | | |
| --- | --- | --- | --- | --- | --- | --- | --- | --- | --- | --- |
| Table 1 | 1 | 2 | 3 | 4 | 5 | 6 | 1 | 2 | 3 | 4 |
| NR | 50 | 50 | 50 | 50 | 50 | 50 | 50 | 50 | 50 | 50 |
| SBR | 50 | 50 | 50 | 50 | 50 | 50 | 50 | 50 | 50 | 50 |
| Carbon black | 45 | 45 | 45 | 45 | 45 | 45 | 45 | 45 | 45 | 45 |
| Silica |  |  | 10 | 10 | 10 | 10 | 10 | 10 | 10 | 10 |
| Zinc oxide | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Aroma oil | 30 | 30 | 30 | 30 | 30 | 30 | 30 | 30 | 30 | 30 |
| Cresol formaldehyde resin |  | 2 | 2 |  | 10 | 2 | 2 | 5 | 2 | 2 |
| Resorcin formaldehyde resin |  |  |  | 2 |  |  |  |  |  |  |
| Modified etherified methylol melamine |  | 1.5 | 1.5 |  | 8 |  | 1.5 | 4 | 1.5 | 1.5 |
| Hexamethoxymethylated melamine |  |  |  | 1.5 |  | 1.5 |  |  |  |  |
| Vulcanization accelerator NS |  |  | 1.3 |  |  |  |  |  |  |  |
| Vulcanization accelerator DM | 1.3 | 1.3 |  | 1.3 | 1.3 | 1.3 | 1.3 | 1.3 | 2.5 | 1.3 |
| Sulfur | 2.5 | 2.5 | 2.5 | 2.5 | 2.5 | 2.5 | 2.5 | 2.5 | 2.5 | 3 |
| Peel force (N/mm) | 12.0 | 13.2 | 14.0 | 9.1 | 10.6 | 11.5 | 14.3 | 15.1 | 16.9 | 15.0 |
| Rubber sticking (%) | 60 | 95 | 47 | 100 | 100 | 95 | 95 | 100 | 100 | 100 |

The following components were used as the rubber components and compositional components in Table 1.

NR: Natural rubber (TSR-20)
SBR: NIPOL 1502 (available from Zeon Corporation)
Carbon black: HAF (available from Showa Cabot K.K.)
Silica: Tokusil GU (BET specific surface area: 121 m$^2$/g, available from Tokuyama Corporation)
Zinc oxide: Zinc Oxide III (available from Seido Chemical Industry Co., Ltd.)
Stearic acid: stearic acid beads (available from Nippon Oil & Fats Co., Ltd.)
Aroma oil: Extract No. 4S (available from Showa Shell Sekiyu K.K.)
Cresol formaldehyde resin: Sumikanol 610 (available from Taoka Chemical Co., Ltd.)
Resorcin formaldehyde resin: Penacolite Resin B-18-S (available from Indspec Chemical Corp.)
Modified etherified methylol melamine: Sumikanol 507A (available from Bara Chemical Co., Ltd.)
Hexamethoxymethylated melamine: CYREZ 964RPC (available from Cytec Industries Incorporated)
Vulcanization accelerator NS: N-tert-butyl-2-benzothiazolylsulfenamide (NOCCELER NS-P, available from Ouchi Shinko Chemical Industrial Co., Ltd.)
Vulcanization accelerator DM: di-2-benzothiazolyl disulfide (NOCCELER DM-P (DM), available from Ouchi Shinko Chemical Industrial Co., Ltd.)
Sulfur: powdered sulfur (available from Karuizawa Refinery Ltd.)

From the results shown in Table 1, it was found that when silica was not compounded, the peeling force was inferior regardless of the presence of the compounding of a cresol formaldehyde resin (Comparative Examples 1 and 2).

In addition, it was found that rubber sticking was significantly inferior when di-2-benzothiazolyl disulfide was not compounded and another vulcanization accelerator was compounded (Comparative Example 3).

Furthermore, it was found that when a resorcin formaldehyde resin was compounded instead of a cresol formaldehyde resin, and hexamethoxymethylated melamine was compounded instead of a modified etherified methylol melamine, the peeling force was inferior (Comparative Example 4).

Furthermore, it was found that when more than 4 parts by mass of the modified etherified methylol melamine was compounded, the peeling force was inferior (Comparative Example 5).

Furthermore, it was found that when a modified etherified methylol melamine was not compounded and hexamethoxymethylated melamine was compounded, the peeling force was inferior (Comparative Example 6).

In contrast, it was found that rubber coating compositions obtained by compounding predetermined amounts of a diene-based rubber component, di-2-benzothiazolyl disulfide, silica, a cresol formaldehyde resin, and a modified etherified methylol melamine, excelled in both peeling force and rubber sticking, and exhibited excellent canvas adhesiveness (Examples 1 to 4).

REFERENCE SIGNS LIST

10: Laminate (reinforcing layer)
11, 11a, 11b, 11c: Rubber coating layer
12, 12a, 12b: Canvas
20: Conveyor belt
21: Upper surface cover rubber layer
22: Lower surface cover rubber layer
30: Adhesion test body

The invention claimed is:

1. A rubber coating composition for a conveyor belt, the composition consisting of: a diene-based rubber component; di-2-benzothiazolyl disulfide; silica; a cresol formaldehyde resin; a modified etherified methylol melamine; and at least one components selected from the group consisting of an additional filler, sulfur, one or more vulcanization accelerating aids, one or more anti-aging agents, and one or more softening agents; wherein
 a content amount of the di-2-benzothiazolyl disulfide is from 0.25 parts by mass to 3.0 parts by mass per 100 parts by mass of the diene-based rubber component;
 a content amount of the silica is from 5.0 parts by mass to 15.0 parts by mass per 100 parts by mass of the diene rubber component;
 a content amount of the cresol formaldehyde resin is from 1 part by mass to 5 parts by mass per 100 parts by mass of the diene-based rubber component; and
 a content amount of the modified etherified methylol melamine is from 1 part by mass to 4 parts by mass per 100 parts by mass of the diene-based rubber component.

2. A laminate comprising: a canvas, and rubber coating layers provided on both sides of the canvas, each of the rubber coating layers being a rubber layer that is formed using the rubber coating composition for a conveyor belt according to claim 1.

3. The laminate according to claim 2, wherein the canvas comprises nylon fibers or polyester fibers.

4. A conveyor belt comprising an upper surface cover rubber layer, a laminate according to claim 2, and a lower surface cover rubber layer.

5. A conveyor belt comprising an upper surface cover rubber layer, a laminate according to claim 3, and a lower surface cover rubber layer.

* * * * *